US008843081B2

(12) United States Patent
Sahota

(10) Patent No.: US 8,843,081 B2
(45) Date of Patent: Sep. 23, 2014

(54) RECEIVER WITH TRANSMIT SIGNAL CANCELLATION

(75) Inventor: Gurkanwal Singh Sahota, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 250 days.

(21) Appl. No.: 13/108,905

(22) Filed: May 16, 2011

(65) Prior Publication Data

US 2012/0295553 A1  Nov. 22, 2012

(51) Int. Cl.
*H04B 1/40* (2006.01)
*H04B 1/52* (2006.01)

(52) U.S. Cl.
CPC ........................ *H04B 1/525* (2013.01)
USPC .......................................... 455/75

(58) Field of Classification Search
USPC ............ 455/73, 422.1, 75; 324/225; 375/267, 375/259, 260; 84/728
See application file for complete search history.

(56) References Cited

U.S. PATENT DOCUMENTS

| 3,699,444 | A | 10/1972 | Ghose et al. |
| 4,747,160 | A * | 5/1988 | Bossard ............... 455/422.1 |
| 5,179,302 | A | 1/1993 | Wagner |
| 6,211,671 | B1 * | 4/2001 | Shattil ...................... 324/225 |
| 7,142,811 | B2 | 11/2006 | Terranova et al. |
| 7,236,802 | B2 | 6/2007 | Cairo |
| 7,372,327 | B2 | 5/2008 | Westwick et al. |
| 7,848,713 | B2 | 12/2010 | Cabanillas et al. |
| 8,005,448 | B1 | 8/2011 | Yan et al. |
| 8,090,044 | B2 * | 1/2012 | Rofougaran ............... 375/267 |
| 8,208,865 | B2 | 6/2012 | Mikhemar et al. |
| 2003/0022638 | A1 | 1/2003 | Imai et al. |
| 2003/0235160 | A1 | 12/2003 | Saifuddin |

(Continued)

FOREIGN PATENT DOCUMENTS

| EP | 2296286 A2 | 3/2011 |
| EP | 2393211 A2 | 12/2011 |

(Continued)

OTHER PUBLICATIONS

Darabi, et al., "Highly Integrated and Tunable RF Front Ends for Reconfigurable Multiband Transceivers: A Tutorial," IEEE Transactions on Circuits and Systems, Regular Papers, vol. 58, No. 9, Sep. 2011, pp. 2038-2050.

(Continued)

*Primary Examiner* — April G Gonzales
(74) *Attorney, Agent, or Firm* — Ramin Mobarhan

(57) ABSTRACT

A receiver with transmit (TX) signal cancellation is disclosed. In an exemplary design, an apparatus includes an adjustment circuit, a transformer (e.g., a balun), and a low noise amplifier (LNA). The adjustment circuit receives a version of a TX signal and provides an adjusted TX signal, which may have adjustable amplitude and/or phase. The transformer receives the adjusted TX signal and a receive (RX) signal including a leaked TX signal, attenuates the leaked TX signal in the RX signal based on the adjusted TX signal, and provides an output RX signal. The TX signal may be transmitted via a primary antenna, and the RX signal may be received via a diversity antenna. The LNA receives the output RX signal and provides an amplified RX signal. The adjustment circuit detects remaining TX signal in the amplified RX signal and adjusts the amplitude and/or phase of the adjusted TX signal to reduce the remaining TX signal.

23 Claims, 7 Drawing Sheets

(56) References Cited

U.S. PATENT DOCUMENTS

| | | |
|---|---|---|
| 2007/0105509 A1 | 5/2007 | Muhammad et al. |
| 2008/0009257 A1 | 1/2008 | Safarian et al. |
| 2008/0242245 A1 | 10/2008 | Aparin |
| 2009/0117855 A1* | 5/2009 | Rofougaran .................... 455/73 |
| 2009/0130990 A1* | 5/2009 | Rofougaran .................... 455/73 |
| 2009/0156152 A1 | 6/2009 | Sahota et al. |
| 2009/0186582 A1 | 7/2009 | Muhammad et al. |
| 2009/0213770 A1 | 8/2009 | Mu |
| 2009/0253385 A1 | 10/2009 | Dent et al. |
| 2010/0029323 A1 | 2/2010 | Tasic et al. |
| 2010/0271987 A1 | 10/2010 | Chiu et al. |
| 2011/0053525 A1 | 3/2011 | Yi |
| 2011/0064005 A1 | 3/2011 | Mikhemar et al. |
| 2011/0068636 A1 | 3/2011 | Lee et al. |
| 2011/0158135 A1 | 6/2011 | Mikhemar et al. |
| 2013/0109330 A1 | 5/2013 | Sahota et al. |
| 2013/0258911 A1 | 10/2013 | Choksi |
| 2013/0259099 A1 | 10/2013 | Gudem et al. |
| 2013/0259102 A1 | 10/2013 | Gudem et al. |
| 2013/0343237 A1 | 12/2013 | Mikhemar et al. |

FOREIGN PATENT DOCUMENTS

| | | |
|---|---|---|
| GB | 1123416 A | 8/1968 |
| WO | 2005050896 A2 | 6/2005 |
| WO | 2011104313 A1 | 9/2011 |

OTHER PUBLICATIONS

International Search Report and Written Opinion—PCT/US2012/038172—ISA/EPO—Nov. 30, 2012 (102975WO).

Mikhemar, et al., "A Tunable Integrated Duplexer with 50dB Isolation in 40nm CMOS," ISSCC 2009, paper 22.7, 2009, pp. 386-387.

Mikhemar, et al., "An On-Chip Wideband and Low-Loss Duplexer for 3G/4G CMOS Radios," IEEE Symposium on VLSI Circuits 2010, pp. 129-130.

Pursula, et al., "Hybrid Transformer-Based Adaptive RF Front End for UHF RFID Mobile Phone Readers," IEEE International Conference on RFID, 2008, pp. 150-155.

Sartori, Eugene F., "Hybrid Transformers," IEEE Transactions on Parts, Materials and Packaging, vol. 4, No. 3, Sep. 1968, pp. 59-66.

Sorsby et al.,"Practical High-Efficiency Partial-Envelope Tracking Power Amplifier System with Broadband Applications", IEEE Radio and Wireless Symposium (RWS) [Online], pp. 104-107.(2010).

Wu et al., "A High IIP2 Gilbert Mixer-Based Downconverter Design for Direct-Conversion WiMAX Receivers", IEEE Radio and Wireless Symposium (RWS) [Online] pp. 404-407 (2010).

\* cited by examiner

RECEIVER WITH TRANSMIT SIGNAL CANCELLATION

BACKGROUND

I. Field

The present disclosure relates generally to electronics, and more specifically to a receiver.

II. Background

A wireless communication device (e.g., a cellular phone) may operate in a wireless communication system utilizing frequency division duplexing (FDD). The wireless device may support full-duplex operation and may be able to simultaneously transmit and receive data for two-way communication. The wireless device may include a transmitter and a receiver coupled to a primary antenna. For data transmission, the transmitter may modulate a radio frequency (RF) carrier signal with data to obtain a modulated signal and may amplify this modulated signal to obtain a transmit (TX) signal having the proper signal level. The TX signal may be routed through a duplexer and transmitted via the primary antenna to a base station. For data reception, the receiver may obtain a receive (RX) signal via the primary antenna and the duplexer. The receiver may condition and process the RX signal to recover data sent by the base station.

The wireless device may include a diversity (DRX) receiver coupled to a diversity/secondary antenna. The diversity receiver may obtain a secondary RX signal via the diversity antenna and may condition and process the secondary RX signal to recover data sent by the base station. The diversity receiver may help mitigate multipath and fading and may also help to cancel interference from other systems on the same frequency. The diversity receiver may improve end user experience by increasing download speed and power and may also provide other advantages.

In full-duplex operation, the circuitry within a receiver may observe interference from a transmitter. For example, a portion of the TX signal may leak from the transmitter to the diversity receiver, and the leaked TX signal may cause interference to a desired signal within the secondary RX signal. The TX signal and the desired signal typically reside in two different frequency bands for a FDD system. Hence, a receive (RX) filter may be used in the diversity receiver to pass the desired signal and to attenuate the leaked TX signal.

The wireless device may be capable of communicating with different wireless systems and/or may support operation on multiple frequency bands. These capabilities may allow the wireless device to receive communication services from more systems and enjoy greater coverage. The wireless device may have multiple receive paths in a receiver for all frequency bands and systems supported by the receiver. Each receive path may include a set of circuit blocks such as an RX filter, a low noise amplifier (LNA), etc. The circuit blocks for each receive path may be designed specifically for the frequency band(s) and/or the system(s) supported by that receiver path. The wireless device may have many receive paths and many circuit blocks in order to support multiple frequency bands and/or multiple systems. These many receive paths may increase the complexity, size, cost and/or power consumption of the wireless device, all of which may be undesirable.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

A receiver (e.g., a diversity receiver) with TX signal cancellation is described herein. The receiver may be used for various electronic devices such as wireless communication devices, cellular phones, personal digital assistants (PDAs), handheld devices, wireless modems, smartphones, laptop computers, smartbooks, netbooks, tablets, cordless phones, wireless local loop (WLL) stations, Bluetooth devices, consumer electronic devices, etc. For clarity, the use of the receiver for a wireless communication device is described below.

Figure 1:
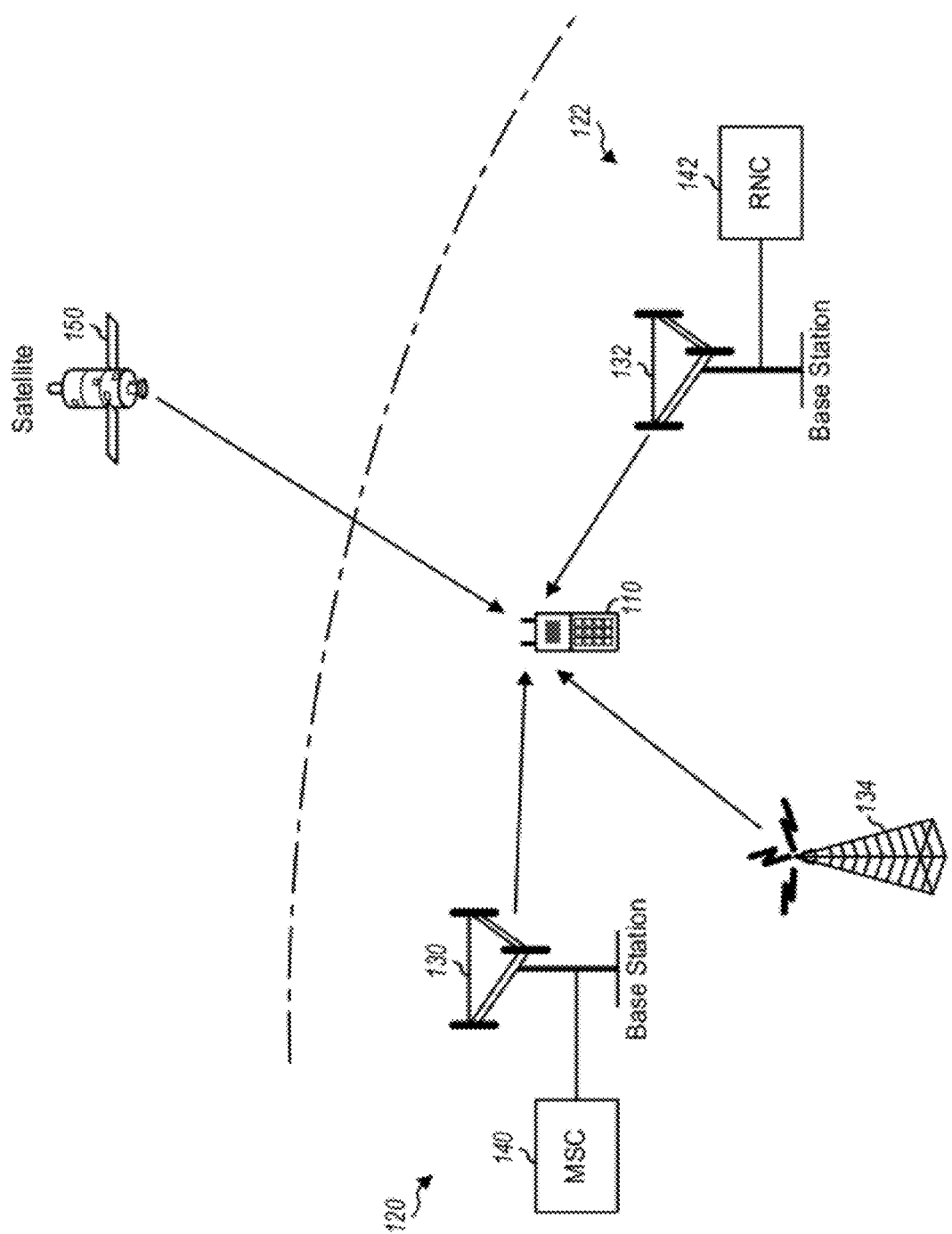
FIG. 1 shows a wireless device communicating with multiple wireless systems.

FIG. 1 shows a wireless communication device 110 capable of communicating with multiple wireless communication systems 120 and 122. Wireless system 120 may be a Code Division Multiple Access (CDMA) system, which may implement Wideband CDMA (WCDMA), cdma2000, or some other version of CDMA. Wireless system 122 may be a Global System for Mobile Communications (GSM) system, a Long Term Evolution (LTE) system, a wireless local area network (WLAN) system, etc. For simplicity, FIG. 1 shows wireless system 120 including one base station 130 and one mobile switching center (MSC) 140, and system 122 including one base station 132 and one radio network controller (RNC). In general, each system may include any number of base stations and any set of network entities.

Wireless device 110 may also be referred to as a user equipment (UE), a mobile station, a terminal, an access terminal, a subscriber unit, a station, etc. Wireless device 110 may be equipped with any number of antennas. In an exemplary design, wireless device 110 includes two antennas - a primary antenna and a diversity/secondary antenna. Multiple antennas may be used to provide diversity against deleterious path effects such as fading, multipath, interference, etc. Multiple antennas may also be used to support multiple-input multiple-output (MIMO) transmission to improve data rate and/or obtain other benefits. Wireless device 110 may be capable of communicating with wireless system 120 and/or 122. Wireless device 110 may also be capable of receiving signals from broadcast stations (e.g., a broadcast station 134). Wireless device 110 may also be capable of receiving signals from satellites (e.g., a satellite 150) in one or more global navigation satellite systems (GNSS).

In general, wireless device 110 may support communication with any number of wireless systems, which may employ any radio technologies (e.g., WCDMA, cdma2000, GSM, LTE, GPS, etc.). Each wireless system may utilize frequency division duplexing (FDD) or time division duplexing (TDD). For example, a CDMA system may utilize either FDD or TDD, a GSM system may utilize TDD, and a LTE system may utilize either FDD or TDD. For FDD, data transmission and reception may occur simultaneously on different frequency channels. For TDD, data transmission and reception may occur in different time intervals on the same frequency channel. Wireless device 110 may also support operation on any number of frequency bands.

Figure 2:
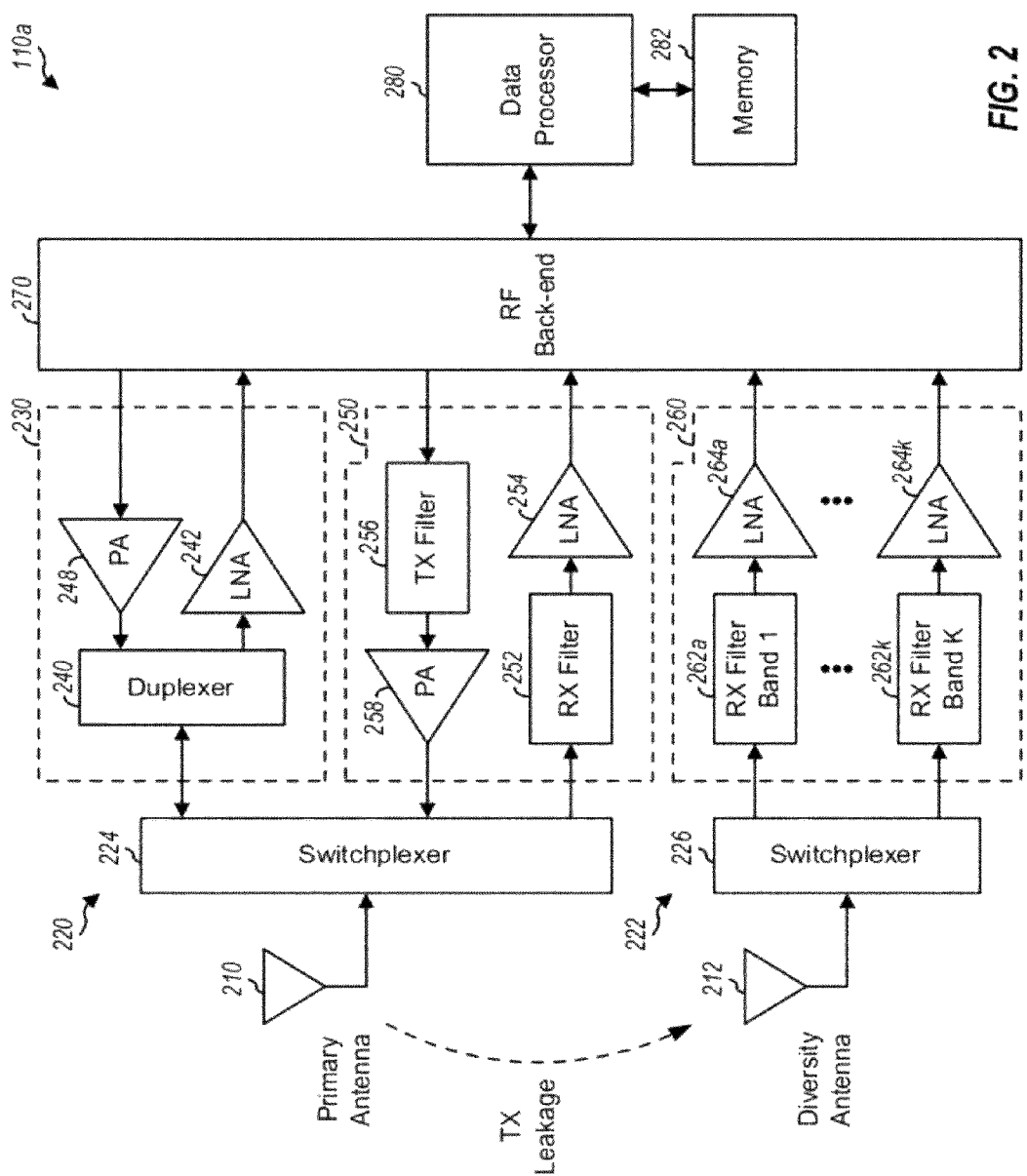
FIG. 2 shows a block diagram of a wireless device with RX filters.

FIG. 2 shows a block diagram of a wireless device 110a, which is an exemplary design of wireless device 110 in FIG. 1. Wireless device 110a includes a primary antenna 210 coupled to a primary section 220 and a diversity antenna 212 coupled to a diversity section 222. For simplicity, FIG. 2 shows primary section 220 including (i) a transmit/receive (TX/RX) module 230 supporting communication with a FDD system (e.g., a CDMA system) on one frequency band and (ii) a TX/RX module 250 supporting communication with a TDD system (e.g., a GSM system) on one frequency hand. Primary section 220 may include additional TX/RX modules to support communication with more wireless systems and/or on more frequency bands. Diversity section 222 includes an RX module 260 supporting data reception on multiple (K) frequency bands.

Within primary section 220, a switchplexer 224 performs switching to (i) couple either TX/RX module 230 or TX/RX module 250 to primary antenna 210 and (ii) switch between transmit and receive when TX/RX module 250 is selected for communication with a TDD system. Switchplexer 224 has an antenna port coupled to primary antenna 210 and input ports coupled to (i) a duplexer 240 within TX/RX module 230 and (ii) a power amplifier (PA) 258 and an RX filter 252 within TX/RX module 250. Switchplexer 224 couples the antenna port to one of the input ports at any given moment.

Within TX/RX module 230, in the transmit path, an output RF signal from an RF back-end 270 is amplified by a power amplifier 248 to obtain a TX signal, which is routed through a duplexer 240 and switchplexer 224 to primary antenna 210. In the receive path, an RX signal from switchplexer 224 is routed through duplexer 240 and amplified by a LNA 242 to obtain an input RF signal, which is provided to RF back-end 270. Duplexer 240 routes the RX signal from switchplexer 224 to LNA 242 and routes the TX signal from power amplifier 248 to switchplexer 224. Duplexer 240 also performs filtering for both the transmit and receive paths. For simplicity, FIG. 2 shows a single duplexer 240 for a single frequency band. TX/RX module 230 may include K duplexers and K sets of power amplifier and LNA for K frequency bands.

Within TX/RX module 250, in the transmit path, an output RF signal from RF back-end 270 is filtered by a TX filter 256 and amplified by a power amplifier 258 to obtain a TX signal, which is routed through switchplexer 224 to primary antenna 210. In the receive path, an RX signal from switchplexer 224 is filtered by an RX filter 252 and amplified by a LNA 254 to obtain an input RF signal, which is provided to RF back-end 270.

Within diversity section 222, a switchplexer 226 has an antenna port coupled to diversity antenna 212 and K input ports coupled to K receive paths within RX module 260, where K may be any integer value. The K receive paths may support different frequency bands and/or different wireless systems. Switchplexer 226 selects a frequency band of operation for diversity section 222 and couples an RX signal from diversity antenna 212 to the receive path for the selected frequency band. Each receive path includes an RX filter 262 coupled to a LNA 264. RX filters 262a through 262k for the K receive paths may filter their RX signals for different frequency bands and provide filtered signals to LNAs 264a through 264k, respectively. LNAs 264a through 264k may amplify their filtered signals and provide input RF signals to RF back-end 270.

RF back-end 270 may include various circuit blocks such as downconverters, upconverters, amplifiers, filters, buffers, etc. RF back-end 270 may frequency downconvert, amplify and filter an input RF signal from any of the LNAs and provide an input baseband signal to a data processor 280. RF back-end 270 may also amplify, filter and frequency upconvert an output baseband signal and provide an output RF signal to filter 246 or 256. All or a portion of modules 230, 250 and 260 and RF back-end 270 may be implemented on one or more analog integrated circuits (ICs), RF ICs (RFICs), mixed-signal ICs, etc.

Data processor 280 may perform various functions for wireless device 110a, e.g., processing for data being transmitted and received. A memory 282 may store program codes and data for data processor 280. Data processor 280 may be implemented on one or more application specific integrated circuits (ASICs) and/or other ICs.

As shown in FIG. 2, a portion of a TX signal from primary section 220 may couple to diversity section 222. The coupling may be via antennas 210 and 212 (as shown in FIG. 2) and/or via routing traces. An RX signal from switchplexer 226 to each RX filter 262 may include a desired signal at a receive frequency band as well as a leaked TX signal at a transmit frequency band. The TX signal may have a large amplitude (e.g., +23 dBm for CDMA or +33 dBm for GSM) when the wireless device is far from a base station. Hence, even though the coupling may be relatively small, the leaked TX signal may be large relative to the desired signal due to the large amplitude of the TX signal. RX filter 262 for each receive path may pass the desired signal in the receive frequency band and attenuate the leaked TX signal in the transmit frequency band so that as little of the leaked TX signal passes to LNA 264 in that receive path and good performance can be obtained.

In general, a receiver may include any number of RX filters for any number of frequency bands. The RX filters may also be referred to as front-end RF filters and may typically be high quality factor (Q) filters. For example, the RX filters may be implemented with surface acoustic wave (SAW) filters, bulk acoustic wave (BAW) filters, or thin film bulk acoustic resonator (FBAR) filters, which typically cannot be integrated on an IC chip. One RX filter and one LNA may be used for each frequency band. For example, wireless device 110a may include five SAW filters and five LNAs to support five frequency bands. The use of multiple RX filters and multiple LNAs to support multiple frequency bands would increase cost, board area, and routing complexity for wireless device 110a.

In an aspect, TX signal cancellation may be performed to attenuate a leaked TX signal in a receive path. In an exemplary design, TX signal cancellation may be performed using a transformer. The transformer may be able to operate at multiple frequency bands. Hence, TX signal cancellation using the transformer may enable elimination of multiple RF filters used to attenuate the leaked TX signal in the receive paths. The transformer may be implemented in various manners. For clarity, much of the description below is for an exemplary design in which the transformer is implemented with a balun.

Figure 3:
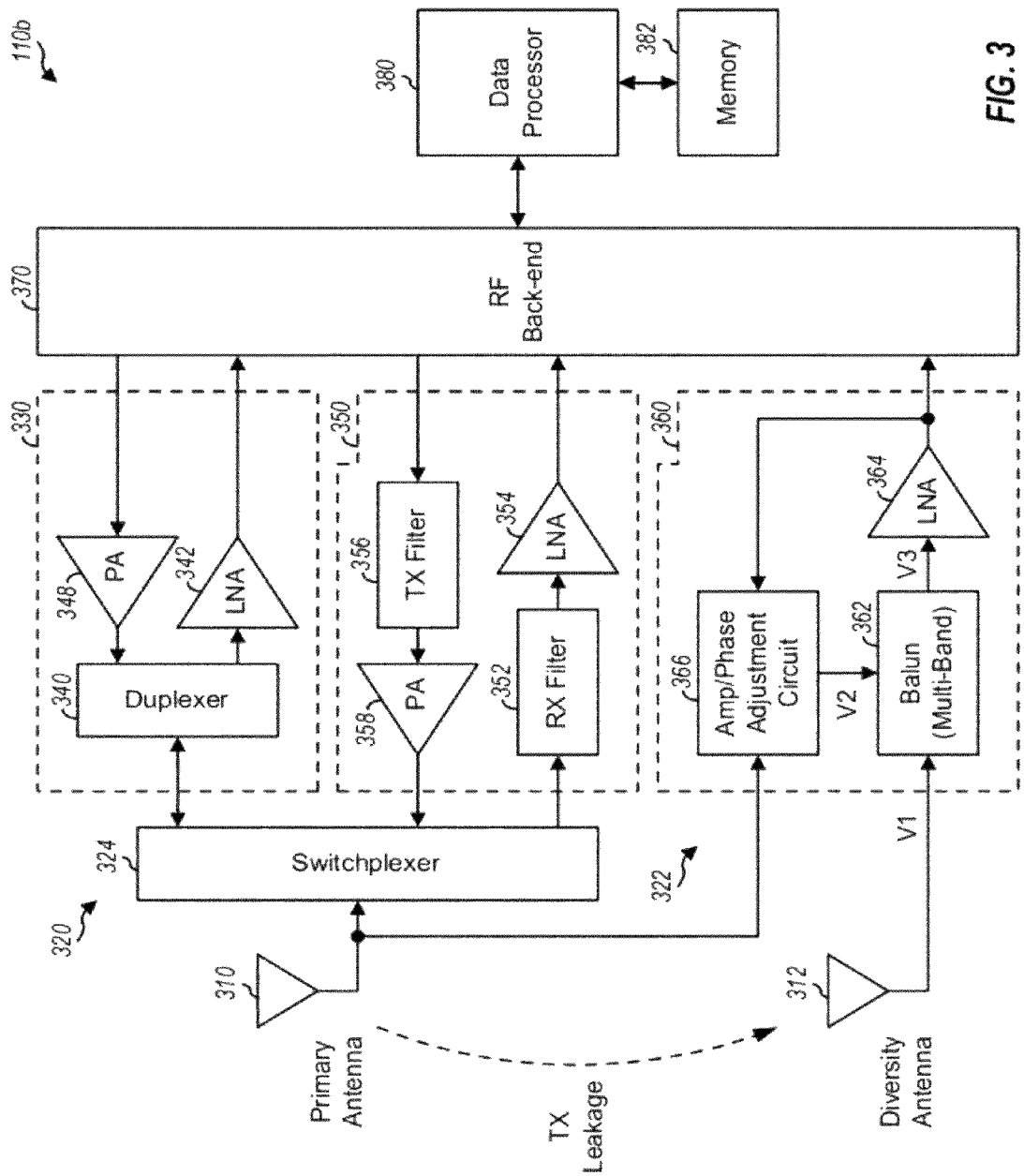
FIG. 3 shows a block diagram of a wireless device with TX signal cancellation.

FIG. 3 shows a block diagram of a wireless device 110b, which is another exemplary design of wireless device 110 in FIG. 1. Wireless device 110b includes a primary antenna 310 coupled to a primary section 320 and a diversity antenna 312 coupled to a diversity section 322. Primary section 320 includes a switchplexer 324, a TX/RX module 330 for a FDD system, and a TX/RX module 350 for a TDD system. TX/RX module 330 includes a duplexer 340, a LNA 342, and a power amplifier 348, which are coupled as described above for TX/RX module 230 in FIG. 2. TX/RX module 350 includes an RX filter 352, a LNA 354, a TX filter 356, and a power amplifier 358, which are coupled as described above for TX/RX module 250 in FIG. 2.

Within diversity section 322, a balun 362 is coupled to diversity antenna 312 and a LNA 364. Balun 362 may be a current transformer and may be implemented with a Guanella balun or some other type of balun. An amplitude/phase adjustment circuit 366 has a signal input coupled to primary antenna 310, a feedback input coupled to the output of LNA 364, and a signal output coupled to balun 362. The feedback input of adjustment circuit 366 may also be coupled to a data processor 380 or any part in the RF transceiver. Balun 362 has an output coupled to LNA 364, which is further coupled to an RF back-end 370. Data processor 380 may perform various functions for wireless device 110b, e.g., processing for data being transmitted and received. A memory 382 may store program codes and data for data processor 380.

As shown in FIG. 3, adjustment circuit 366 may receive a replica TX signal, which may be obtained based on a TX signal from a transmitter. Adjustment circuit 366 may adjust the amplitude and/or phase of the replica TX signal to obtain an adjusted TX signal, which is denoted as V2 in FIG. 3. An RX signal from secondary antenna 312 (which is denoted as V1 in FIG. 3) and the adjusted TX signal may be applied to balun 362. The RX signal includes a leaked TX signal, which may be due to the TX signal coupling via antennas 310 and 312 and/or via other means. Balun 362 attenuates the leaked TX signal in the RX signal by subtracting the adjusted TX signal from the RX signal. Balun 362 provides an output RF signal (which is denoted as V3 in FIG. 3) to LNA 364. The gain and phase of the adjusted TX signal can be varied such that as much of the leaked TX signal in the RX signal is canceled as possible.

Figure 4:
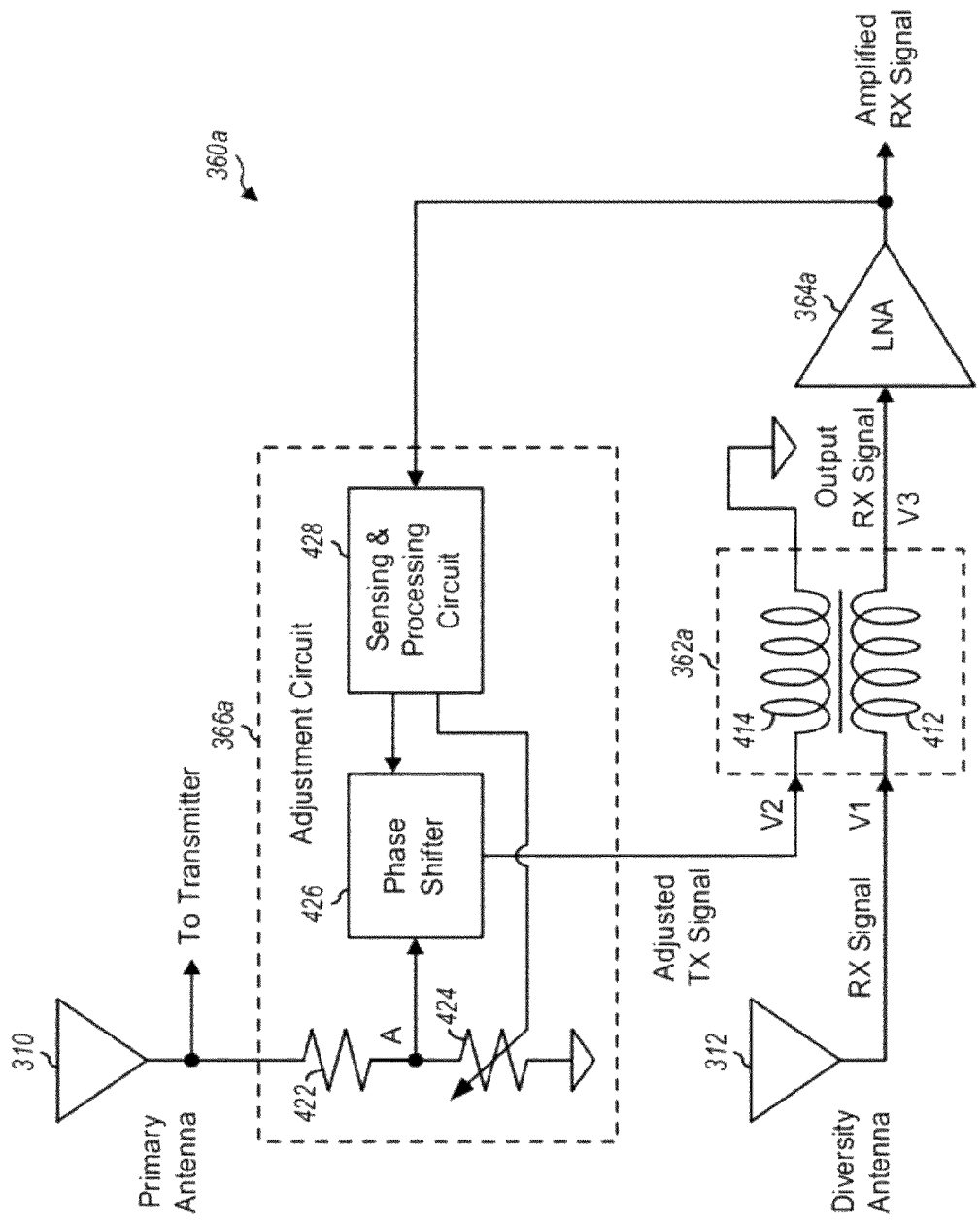
FIGS. 4 and 5 show two exemplary designs of receivers with TX signal cancellation.

FIG. 4 shows a schematic diagram of a diversity section 360a with TX signal cancellation, which is an exemplary design of diversity section 360 in FIG. 3. Diversity section 360a includes a balun 362a, a single-ended LNA 364a, and an amplitude and phase adjustment circuit 366a, which are an exemplary design of balun 362, LNA 364, and adjustment circuit 366 in FIG. 3. Balun 362a includes a primary coil 412 and a secondary coil 414. Primary coil 412 has one end coupled to diversity antenna 312 and the other end coupled to the input of LNA 364a. Secondary coil 414 has one end coupled to a signal output of adjustment circuit 366a and the other end coupled to circuit ground.

Within adjustment circuit 366a, a resistor 422 is coupled between primary antenna 310 and node A. A variable resistor 424 is coupled between node A and circuit ground. A phase shifter 426 has a signal input coupled to node A and a signal output providing an adjusted TX signal to balun 362a. A sensing and processing circuit 428 has a feedback input coupled to the output of LNA 364a, a first control output coupled to variable resistor 424, and a second control output coupled to a control input of phase shifter 426. The feedback input of sensing and processing circuit 428 may also be coupled to an output of a baseband circuit, an output of a mixer, etc. In any case, circuit 428 measures the leaked TX signal and uses this information to adjust the amplitude and phase of the adjusted TX signal to cancel the leaked TX signal.

Phase shifter 426 receives a replica TX signal at node A and provides an adjusted TX signal to balun 362a. Balun 362a receives the RX signal from diversity antenna 312 at primary coil 412 and the adjusted TX signal at secondary coil 414. Balun 362a cancels the leaked TX signal in the RX signal based on the adjusted TX signal and provides the output RF signal to LNA 364a. Circuit 428 receives an amplified RF signal from LNA 364a and senses the remaining TX signal in the amplified RF signal. Circuit 428 adjusts the amplitude and/or phase of the adjusted TX signal such that the remaining TX signal is as small as possible. Circuit 428 may adjust the amplitude of the adjusted TX signal by varying the value of adjustable resistor 424. Circuit 428 may adjust the phase of the adjusted TX signal by controlling the amount of phase shift by phase shifter 426.

Figure 5:
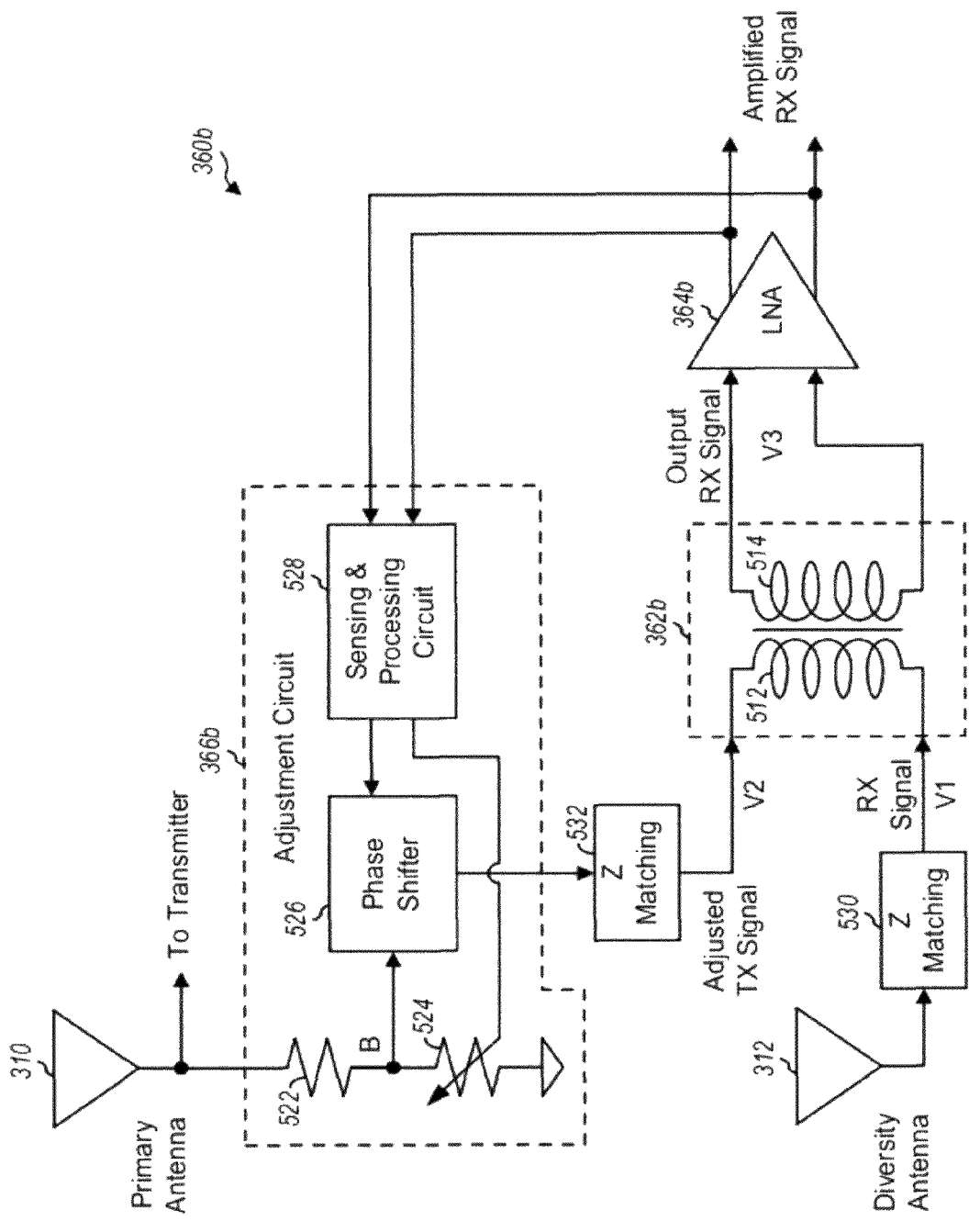

FIG. 5 shows a schematic diagram of a diversity section 360b with TX signal cancellation, which is another exemplary design of diversity section 360 in FIG. 3. Diversity section 360b includes a balun 362b, a differential LNA 364b, and an amplitude and phase adjustment circuit 366b, which are another exemplary design of balun 362, LNA 364, and adjustment circuit 366 in FIG. 3. Balun 362b includes a primary coil 512 and a secondary coil 514. Primary coil 512 has a first end coupled to diversity antenna 312 via an impedance (Z) matching circuit 530 and a second end coupled to adjustment circuit 366b via an impedance matching circuit 532. Matching circuit 530 performs impedance matching between diversity antenna 312 and balun 362b. Matching circuit 532 performs impedance matching between adjustment circuit 366b and balun 362b. Secondary coil 514 has two ends coupled to a differential input of LNA 364b.

Within adjustment circuit 366b, a resistor 522 is coupled between primary antenna 310 and node B. A variable resistor 524 is coupled between node B and circuit ground. A phase shifter 526 has its signal input coupled to node B and its signal output providing an adjusted TX signal to balun 362b via impedance matching circuit 532. A sensing and processing circuit 528 has a feedback input coupled to the output of LNA 364b, a first control output coupled to variable resistor 524, and a second control output coupled to a control input of phase shifter 526.

Phase shifter 526 receives a replica TX signal at node B and provides an adjusted TX signal to balun 362b via impedance matching circuit 532. Balun 362b receives the RX signal from diversity antenna 312 at a first end of primary coil 512 and the adjusted TX signal at a second end of primary coil 512. Primary coil 512 suppresses signal components that are common to both the first and second ends (which should include the leaked TX signal) and couples signal components that are different at the first and second ends (which should include the desired signal) to secondary coil 514. Primary coil 512 thus cancels the leaked TX signal in the RX signal based on the adjusted TX signal. Secondary coil 514 provides a differential output RF signal to LNA 364b. Circuit 528 receives an amplified RF signal from LNA 364b and senses the remaining TX signal in the amplified RF signal. Circuit 528 adjusts the amplitude and/or phase of the adjusted TX signal such that the remaining TX signal is as little as possible. Circuit 528 may adjust the amplitude of the adjusted TX signal by varying the value of adjustable resistor 524. Circuit 528 may adjust the phase of the adjusted TX signal by controlling the amount of phase shift by phase shifter 526.

FIGS. 4 and 5 show two exemplary designs of performing TX signal cancellation using a balun. In general, a replica TX signal from a primary antenna may be adjusted in amplitude and/or phase such that an adjusted TX signal is aligned in amplitude and phase with a leaked TX signal in an RX signal from a diversity antenna. The adjusted TX signal may be subtracted from the RX signal using the balun. The remaining TX signal after TX signal cancellation may be detected and processed to provide phase and amplitude adjustments.

FIGS. 4 and 5 show two exemplary designs of coupling an RX signal from a diversity antenna and an adjusted TX signal to a balun for TX signal cancellation. In general, the RX signal and the adjusted TX signal may be applied to the same coil (e.g., as shown in FIG. 5) or different coils (e.g., as shown in FIG. 4). The balun may also be coupled to a LNA via a single-ended connection (e.g., as shown in FIG. 4) or a differential connection (e.g., as shown in FIG. 5).

FIGS. 4 and 5 show an exemplary design of adjusting the amplitude and phase of the replica TX signal using a resistive voltage divider and a phase shifter. The amplitude and phase of the replica TX signal may also be adjusted in other manners, e.g., using a multiplier, a gain element with adjustable delay, etc.

TX signal cancellation using a balun may be performed for a diversity receiver to attenuate a leaked TX signal from a primary transmitter, as described above. TX signal cancellation using a balun may also be performed for a receiver to attenuate a leaked TX signal from a transmitter that is coupled to the same antenna as the receiver.

A balun may be implemented in various manners. The primary and secondary coils of the balun may be implemented with various patterns to obtain the desired inductance and coupling. The primary and secondary coils may also be fabricated on one or more conductive layers.

Figure 6:
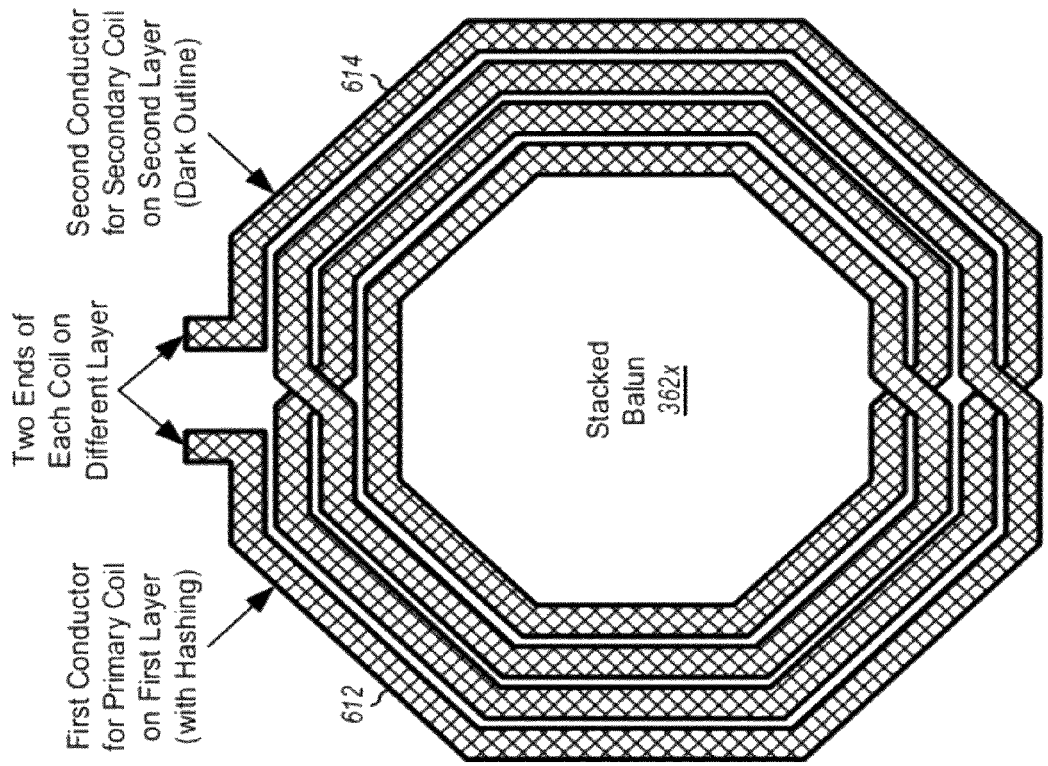

FIG. 6 shows a top view of an exemplary design of a stacked balun 362x, which may be used for balun 362a in FIG. 4 or balun 362b in FIG. 5. In this exemplary design, balun 362x includes a primary coil 612 and a secondary coil 614 fabricated on two conductive layers of an RFIC. Primary coil 612 is implemented with a first conductor arranged in a spiral pattern on a first conductive layer. Secondary coil 614 is implemented with a second conductor arranged in a spiral pattern on a second conductive layer. The second conductor for secondary coil 614 overlaps the first conductor for primary coil 612. Primary coil 612 is shown with cross hashing, and secondary coil 614 is shown with dark outlines in FIG. 6.

Figure 7:
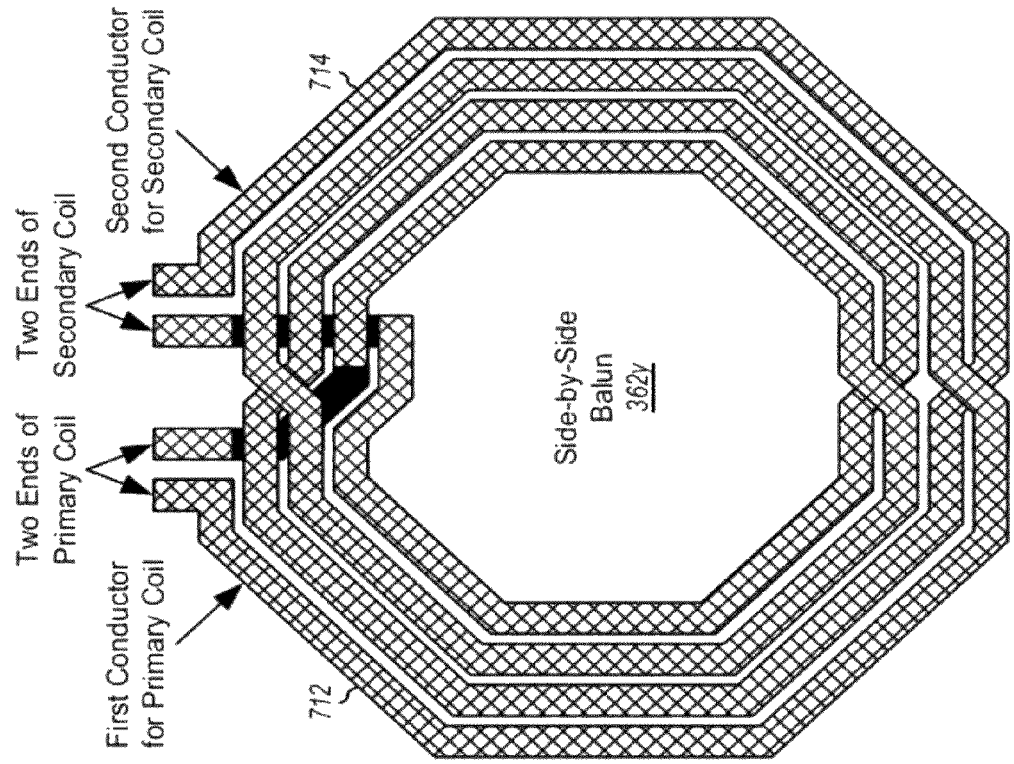
FIGS. 6 and 7 show two exemplary designs of a balun.

FIG. 7 shows a top view of an exemplary design of a side-by-side balun 362y, which may also be used for balun 362a in FIG. 4 or balun 362b in FIG. 5. In this exemplary design, balun 362y includes a primary coil 712 and a secondary coil 714 fabricated on a single conductive layer of an RFIC. Primary coil 712 is implemented with a first conductor arranged in a spiral pattern on a conductive layer. Secondary coil 714 is implemented with a second conductor arranged in a spiral pattern on the same conductive layer. The second conductor for secondary coil 714 is interlaced or interwoven with the first conductor for primary coil 712, as shown in FIG. 7.

FIGS. 6 and 7 show two exemplary designs of a balun that may be used for TX signal cancellation. In general, the primary and secondary coils of a balun may each be implemented with any number of turns. The secondary coil may have fewer, more, or the same number of turns as the primary coil. The number of turns, the diameter of the turns, the width and height of each conductor, the spacing between the two conductors for the primary and secondary coils, and/or other attributes of the two conductors may be selected to obtain the desired inductance and Q for each coil and the desired coupling coefficient between the two coils. The coupling coefficient may be varied by controlling the placement of the two conductors and/or the distance between the conductors.

FIGS. 6 and 7 show exemplary designs in which the primary and secondary coils are implemented with spiral patterns. The primary and secondary coils may also be implemented in other manners such as with a double spiral, zig-zag, or some other pattern. The primary and secondary coils may also be fabricated with various conductive materials such as a low-loss metal (e.g., copper), a more lossy metal (e.g., aluminum), or some other material. Higher Q may be achieved for a coil fabricated on a low-loss metal layer. A smaller-size coil may be fabricated on a lossy metal layer because different IC design rules may apply.

The stacked topology in FIG. 6 may allow balun 362x to be fabricated in a smaller area and may also result in better matching between the two ends of the secondary coil for a differential design. The side-by-side topology in FIG. 7 may be used when there is a limited number of metal layers.

A receiver with TX signal cancellation described herein may provide certain advantages. First, TX signal cancellation with a balun can eliminate the need for RX filters to attenuate a leaked TX signal in an RX signal. This may be especially beneficial for a diversity receiver supporting operation on multiple frequency bands. Second, TX signal cancellation with a balun may reduce cost and board area, which may be especially desirable for wireless devices supporting multiple frequency bands and/or multiple wireless systems. Third, TX signal cancellation may simplify routing of signal lines. For example, K sets of signal lines for K receive paths in FIG. 2 may be replaced with a single set of signal lines for a single receive path in FIG. 3. TX signal cancellation may also provide other benefits.

In an exemplary design, an apparatus (e.g., a wireless device, an IC, etc.) may comprise an adjustment circuit coupled to a transformer, e.g., as shown in FIG. 3. The adjustment circuit may receive a version of a TX signal and provide an adjusted TX signal, which may have an adjustable amplitude and/or an adjustable phase. The transformer may receive the adjusted TX signal and an RX signal comprising a leaked TX signal, attenuate the leaked TX signal in the RX signal based on the adjusted TX signal, and provide an output RX signal. In an exemplary design, the transformer may comprise a balun. The apparatus may further comprise a LNA coupled to the transformer. The LNA may receive the output RX signal and provide an amplified RX signal.

In an exemplary design, the apparatus may comprise a primary antenna to radiate the TX signal and a diversity antenna to provide the RX signal. In this exemplary design, TX signal cancellation may be performed for a diversity receiver coupled to the diversity antenna in order to attenuate a TX signal from a primary transmitter that is coupled to the primary antenna. In another exemplary design, the apparatus may comprise an antenna to both radiate the TX signal and provide the RX signal. In this exemplary design, TX signal cancellation may be performed for a receiver to attenuate a TX signal from a transmitter, with both the transmitter and the receiver being coupled to the same antenna.

In an exemplary design, a first impedance matching circuit may be coupled between the transformer and the diversity antenna, e.g., as shown in FIG. 5. A second impedance matching circuit may be coupled between the transformer and the adjustment circuit, e.g., as also shown in FIG. 5. The first and/or second impedance matching circuit may provide outof-band filtering to protect the LNA from out-of-band jammers. In another exemplary design, the transformer may be coupled (i) to the diversity antenna without going through an impedance matching circuit and (ii) to the adjustment circuit without going through an impedance matching circuit, e.g., as shown in FIG. 4.

The transformer may comprise a primary coil and a secondary coil. In an exemplary design, the primary coil may have a first end receiving the RX signal and a second end providing the output RX signal, e.g., as shown in FIG. 4. The secondary coil may have a first end receiving the adjusted TX signal and a second end coupled to circuit ground, e.g., as also shown in FIG. 4. In another exemplary design, the primary coil may have a first end receiving the RX signal and a second end receiving the adjusted TX signal, e.g., as shown in FIG. 5. The secondary coil may provide the output RX signal, e.g., as also shown in FIG. 5.

In an exemplary design, the transformer may receive a single-ended adjusted TX signal and a single-ended RX signal and may provide a single-ended output RX signal, e.g., a shown in FIG. 4. In another exemplary design, the transformer may receive a single-ended adjusted TX signal and a single-ended RX signal and may provide a differential output RX signal, e.g., as shown in FIG. 5. In an exemplary design, the transformer may support operation on a single frequency band. In another exemplary design, the transformer may support operation on a plurality of frequency bands.

In an exemplary design, the adjustment circuit may receive the amplified RX signal from the LNA (or a signal from another circuit in a receive path), generate at least one control signal based on the amplified RX signal, and adjust the amplitude and/or phase of the adjusted TX signal based on the at least one control signal. In an exemplary design, the at least one control signal may comprise (i) a first control signal to adjust the amplitude of the adjusted TX signal and (ii) a second control signal to adjust the phase of the adjusted TX signal, e.g., as shown in FIGS. 4 and 5. In an exemplary design, the adjustment circuit may detect the remaining TX signal in the amplified RX signal and may adjust the amplitude and/or phase of the adjusted TX signal to reduce the remaining TX signal. The adjustment circuit may also adjust the amplitude and/or phase of the adjusted TX signal in other manners. In an exemplary design, the adjustment circuit may be disabled or shut down for low transmit power levels when TX signal cancellation is not needed.

In an exemplary design, the adjustment circuit may comprise a resistive divider coupled to a phase shifter, e.g., as shown in FIGS. 4 and 5. The resistive divider may receive the version of the TX signal and provide an intermediate TX signal having an adjustable amplitude. The phase shifter may receive the intermediate TX signal and provide the adjusted TX signal having adjustable amplitude and phase.

Figure 8:
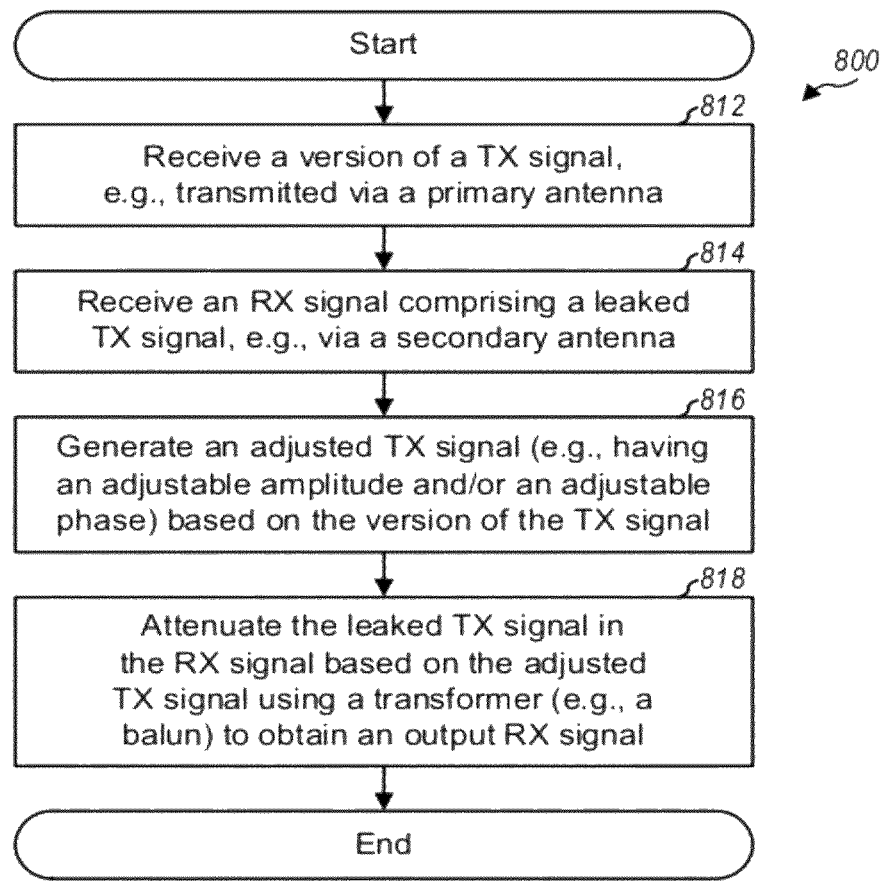
FIG. 8 shows a process for performing TX signal cancellation.

FIG. 8 shows an exemplary design of a process 800 for performing TX signal cancellation. A version of a TX signal may be received at a receiver (block 812). An RX signal comprising a leaked TX signal may also be received at the receiver (block 814). In an exemplary design, the RX signal may be received from a diversity antenna, and the TX signal may be radiated from a primary antenna. In another exemplary design, the RX signal may be received from an antenna, and the TX signal may be radiated from the same antenna.

An adjusted TX signal may be generated based on the version of the TX signal and may have an adjustable amplitude and/or an adjustable phase (block 816). The leaked TX signal in the RX signal may be attenuated based on the adjusted TX signal using a transformer (e.g., a balun) to obtain an output RX signal (block 818).

In an exemplary design of block 816, the output RX signal may be amplified (e.g., with a LNA) to obtain an amplified RX signal. At least one control signal may be generated based on the amplified RX signal. The amplitude and/or phase of the adjusted TX signal may be adjusted based on the at least one control signal, e.g., to reduce the remaining TX signal in the output RX signal or the amplified RX signal.

In an exemplary design of block 818, the RX signal may be applied to a first end of a primary coil of the transformer, the adjusted TX signal may be applied to a first end of a secondary coil of the transformer, and the output RX signal may be provided from a second end of the primary coil, e.g., as shown in FIG. 4. In another exemplary design, the RX signal may be applied to the first end of the primary coil of the transformer, the adjusted TX signal may be applied to the second end of the primary coil, and the output RX signal may be provided from the secondary coil, e.g., as shown in FIG. 5.

A receiver with TX signal cancellation described herein may be implemented on one or more ICs, analog ICs, RFICs, mixed-signal ICs, ASICs, a printed circuit board (PCB), an electronic device, etc. A receiver with TX signal cancellation may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing a receiver with TX signal cancellation may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
an adjustment circuit configured to receive a version of a transmit (TX) signal and to provide an adjusted TX signal; and
a transformer coupled to the adjustment circuit and configured to receive the adjusted TX signal and a receive (RX) signal comprising a leaked TX signal and to attenuate the leaked TX signal in the RX signal based on the adjusted TX signal.

2. The apparatus of claim 1, the adjusted TX signal having at least one of an adjustable amplitude and an adjustable phase.

3. The apparatus of claim 1, further comprising:
a primary antenna to radiate the TX signal; and
a diversity antenna to provide the RX signal.

4. The apparatus of claim 3, further comprising:
a first impedance matching circuit coupled between the transformer and the diversity antenna; and
a second impedance matching circuit coupled between the transformer and the adjustment circuit.

5. The apparatus of claim 1, the transformer comprising a primary coil having a first end receiving the RX signal and a second end providing an output RX signal, and a secondary coil having a first end receiving the adjusted TX signal and a second end coupled to circuit ground.

6. The apparatus of claim 1, the transformer comprising a primary coil having a first end receiving the RX signal and a second end receiving the adjusted TX signal, and a secondary coil providing an output RX signal.

7. The apparatus of claim 1, the transformer receiving a single-ended adjusted TX signal and a single-ended RX signal and providing a differential output RX signal.

8. The apparatus of claim 1, further comprising:
a low noise amplifier (LNA) coupled to the transformer and configured to receive an output RX signal from the transformer and to provide an amplified RX signal.

9. The apparatus of claim 8, the adjustment circuit is configured to receive the amplified RX signal from the LNA, to generate at least one control signal based on the amplified RX signal, and to adjust at least one of an amplitude and a phase of the adjusted TX signal based on the at least one control signal.

10. The apparatus of claim 9, the at least one control signal comprising a first control signal to adjust the amplitude of the adjusted TX signal and a second control signal to adjust the phase of the adjusted TX signal.

11. The apparatus of claim 8, the adjustment circuit is configured to detect remaining TX signal in the amplified RX signal and to adjust at least one of an amplitude and a phase of the adjusted TX signal to reduce the remaining TX signal.

12. The apparatus of claim 1, the adjustment circuit comprising
a resistive divider configured to receive the version of the TX signal and provide an intermediate TX signal having an adjustable amplitude, and
a phase shifter coupled to the resistive divider and configured to receive the intermediate TX signal and provide the adjusted TX signal having adjustable amplitude and phase.

13. The apparatus of claim 1, the transformer comprising a balun.

14. The apparatus of claim 1, the transformer supporting operation on a plurality of frequency bands.

15. The apparatus of claim 1, the apparatus comprising an integrated circuit.

16. A method comprising:
receiving a version of a transmit (TX) signal;
receiving a receive (RX) signal comprising a leaked TX signal;
generating an adjusted TX signal based on the version of the TX signal; and
attenuating the leaked TX signal in the RX signal based on the adjusted TX signal using a transformer.

17. The method of claim 16, the RX signal is received from a diversity antenna, and the TX signal is radiated from a primary antenna.

18. The method of claim 16, further comprising:
amplifying an output RX signal from the transformer to obtain an amplified RX signal;
generating at least one control signal based on the amplified RX signal; and
adjusting at least one of an amplitude and a phase of the adjusted TX signal based on the at least one control signal.

19. The method of claim 16, the generating the adjusted TX signal comprises adjusting at least one of an amplitude and a phase of the adjusted TX signal to reduce remaining TX signal in an output RX signal from the transformer.

20. The method of claim 16, the attenuating the leaked TX signal comprises applying the RX signal to a first end of a primary coil of the transformer, applying the adjusted TX signal to a first end of a secondary coil of the transformer, and providing an output RX signal from a second end of the primary coil.

21. The method of claim 16, the attenuating the leaked TX signal comprises applying the RX signal to a first end of a primary coil of the transformer, applying the adjusted TX signal to a second end of the primary coil, and providing an output RX signal from a secondary coil of the transformer.

22. An apparatus comprising:
means for receiving a version of a transmit (TX) signal;
means for receiving a receive (RX) signal comprising a leaked TX signal;
means for generating an adjusted TX signal based on the version of the TX signal; and
means for attenuating the leaked TX signal in the RX signal based on the adjusted TX signal using a transformer.

23. The apparatus of claim 22, further comprising:
means for amplifying an output RX signal from the transformer to obtain an amplified RX signal;
means for generating at least one control signal based on the amplified RX signal; and
means for adjusting at least one of an amplitude and a phase of the adjusted TX signal based on the at least one control signal.

* * * * *